Figure 1:
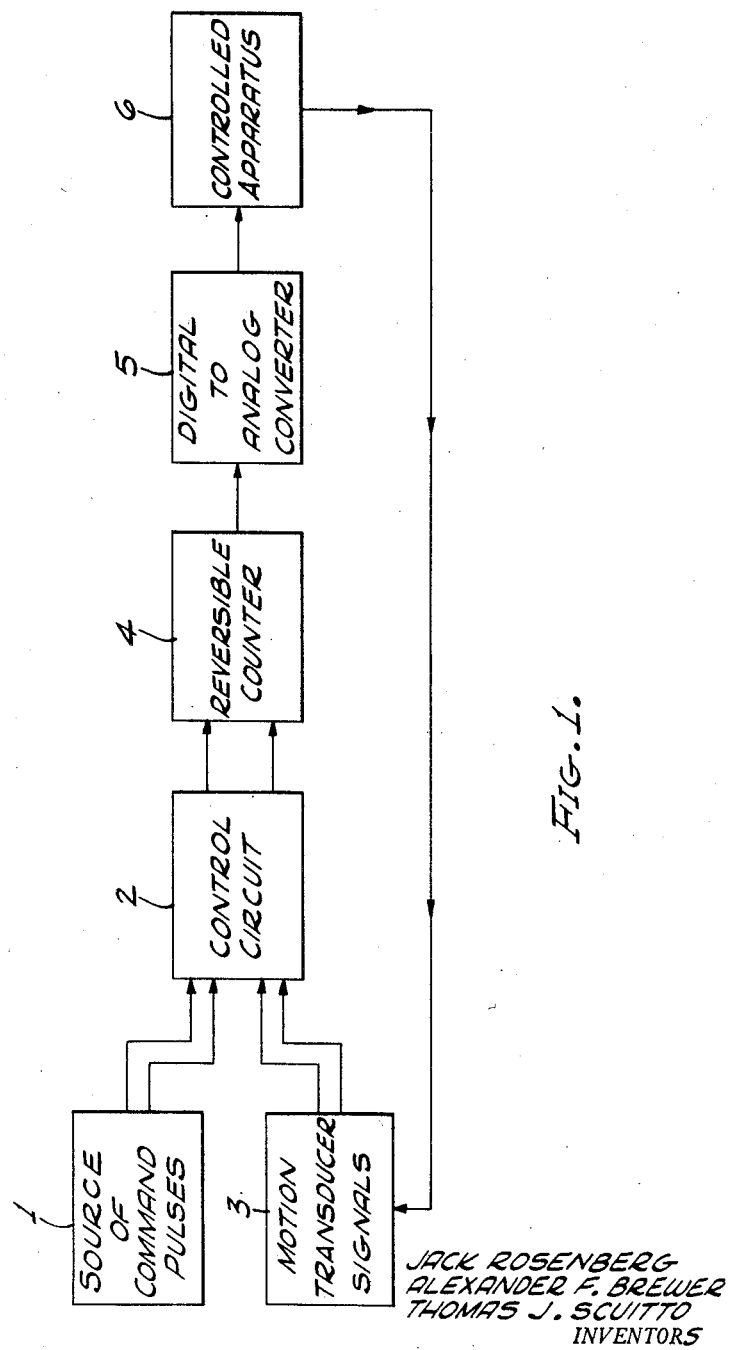

Dec. 24, 1957  J. ROSENBERG ET AL  2,817,775
CONTROL CIRCUIT
Original Filed Nov. 2, 1955  3 Sheets-Sheet 1

JACK ROSENBERG
ALEXANDER F. BREWER
THOMAS J. SCUITTO
INVENTORS

BY
ATTORNEY

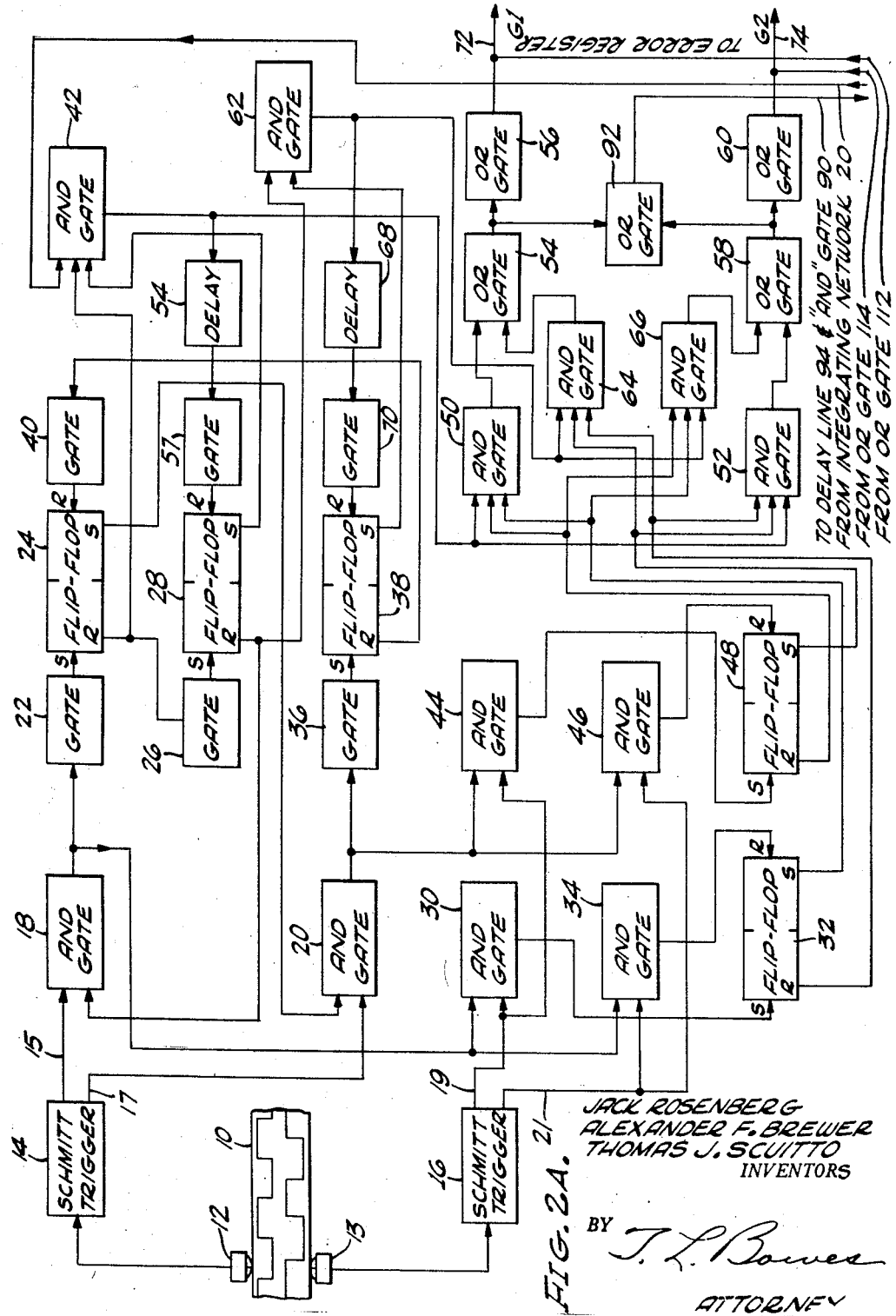

United States Patent Office 2,817,775
Patented Dec. 24, 1957

2,817,775

CONTROL CIRCUIT

Jack Rosenberg and Alexander F. Brewer, Pacific Palisades, and Thomas J. Scuitto, Santa Monica, Calif., assignors to General Dynamics Corporation, Rochester, N. Y., a corporation of Delaware Original application November 2, 1955, Serial No. 544,478. Divided and this application November 13, 1956, Serial No. 621,636

13 Claims. (Cl. 307—106)

This invention relates to electrical servo systems and, more particularly, to control circuits for use in servo systems.

In an application by Jack Rosenberg et al. for an Automation System, which was filed November 2, 1955, bears Serial No. 544,478, and is assigned to a common assignee, there is described and claimed an arrangement for generating and recording command pulses in response to information as to the coordinates of the beginning and ending of a desired path, as well as the type of path desired. These command pulses are then applied to the digital servo control apparatus, which instructs a machine tool so that a path will be described by the cutting tool of the machine tool through a workpiece which corresponds in length and characteristics to the path for which instructions were originally entered into the system. Each command pulse corresponds to an increment of motion along a single co-ordinate. In order to insure that the command pulse instructions are carried out, an arrangement is provided whereby incremental motions by the machine tool in response to each command pulse in turn are used to generate what may be termed response pulses. The difference between the number of command pulses and the number of response pulses indicates that the machine tool must still move further to complete an execution of the instructions received.

An arrangement is described in the previously mentioned application whereby both command and response pulses are applied to an error register which performs the required subtraction operation. The input to this error register consists of both command pulses and response pulses. It is therefore necessary to provide control circuitry whereby the information from the command-pulse source and the response-pulse source is properly maintained in the presence of each other and, also, this information is properly applied to the error register so that it may be instructed to add or subtract in accordance with the direction of motion commanded by the command pulses, as well as add or subtract in accordance with the direction of motion indicated by the response pulses. This circuitry is described and shown in the above-noted application by Jack Rosenberg et al. It constitutes Figures 15A and 15B of the drawings in that application. This application is a division of that application and is directed to the control circuitry shown in Figures 15A and 15B therein.

Accordingly, an object of the present invention is to provide novel and useful control circuitry suitable for employment in an electrical servo loop.

Yet another object of the present invention is the provision of circuitry which can have applied thereto information in the form of motion-command pulses and response pulses and can provide as its output a sequence dictated by the time of arrival the information conveyed by both.

The error register shown and described in the above-noted application by Jack Rosenberg et al. includes a Decatron gas beam-switching tube of a type which is well known and is commercially available from the Atomic Instruments Company of Boston, Massachusetts. This tube, as is well known, requires for adding to or for subtracting from its count indication the application of two pulses to two input terminals, known as guides. The order of application of these two pulses to the two guides determines whether or not the count is advanced or subtracted.

Accordingly, a further object of the present invention is to provide a circuit which, in response to an input consisting of command pulses or response pulses, provides as its output two pulses, the order of appearance of which represents the directions of the motion ordered by the command pulse or represented by the response pulse train applied to its input.

These and other objects of the invention are achieved by providing a first gating arrangement which senses a direction of motion from two trains of phase-displaced signals which are generated in response to said motion. A storage means is provided which stores an indication of the direction of motion sensed. A first means to generate a first and second pulse is actuated in response to an operation of the first gating means. A second gating means is provided which, in response to the direction of motion indicated in said storage means, respectively applies the first and second pulse to a first and second output terminal or to these terminals in reverse. Thus, one motion direction is indicated by a pulse on the first output terminal, followed by a pulse on the second output terminal. The opposite direction of motion is indicated by a pulse on the second output terminal, followed by a pulse on the first output terminal. The following counter will add or subtract a count accordingly. A second storage means is provided which stores an indication of the direction of motion represented by a command pulse. A second means is provided which, in response to the application of a command pulse to the second storage means, generates another first pulse, followed by a second pulse. These also are applied to the first and second output terminals or to the second and first output terminals, as determined by the direction of motion established in the second storage means. Means are also provided which in the event the first means to generate the first and second pulse operates prior to the second means to generate, the second means to generate is prevented from operating until after the first means to generate has completed its operation. Also, in the event that the second means to generate commences operation, means are provided to inhibit operation of the first means to generate until the second means to generate has completed its operation. In the event both command and response inputs occur simultaneously, the second means to generate pulses takes priority since the circuit constants are designed so that it will operate more quickly than the first means to generate.

Figure 2B:
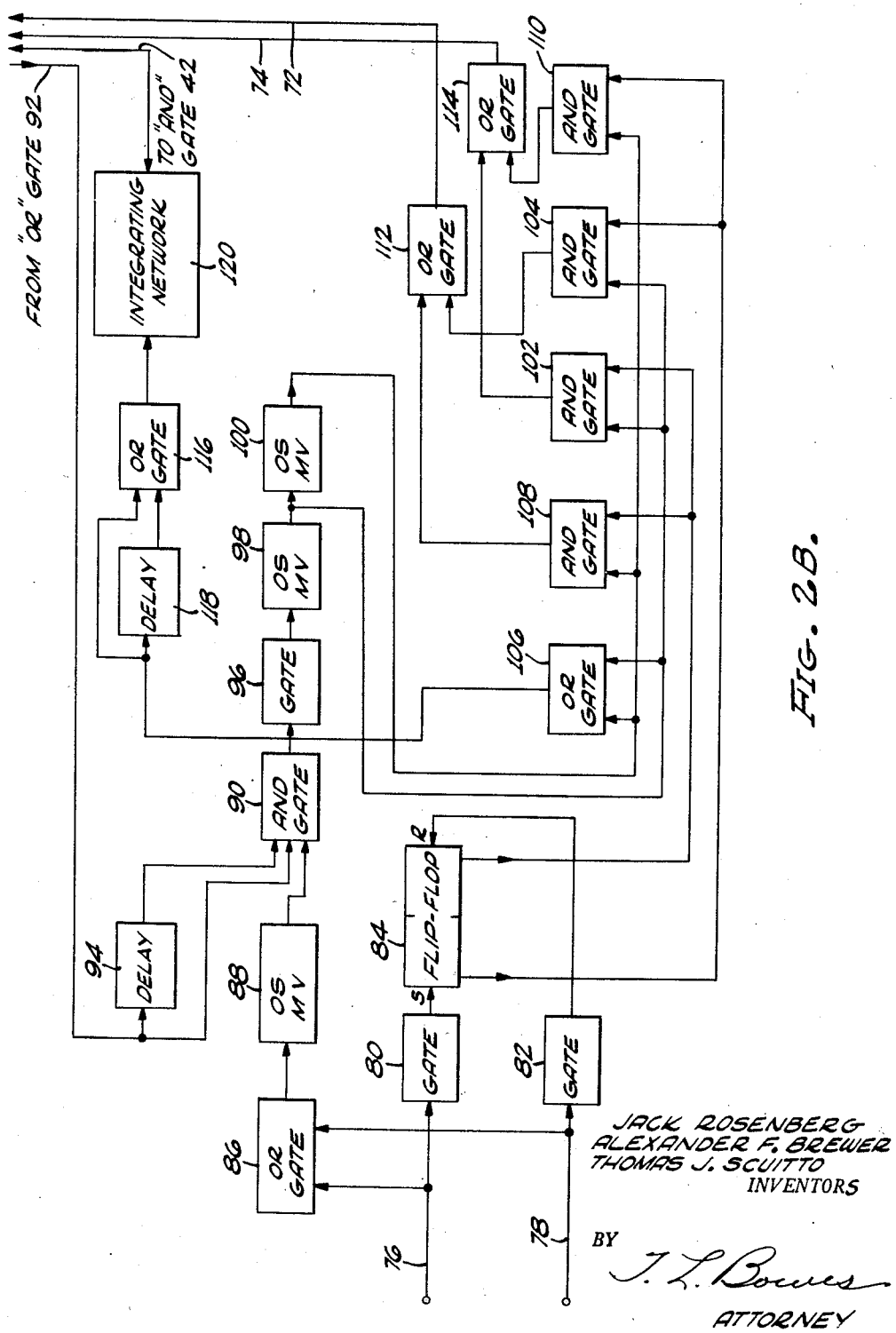

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a block diagram showing an electrical servo loop of the general type in which the embodiment of the invention finds application; and Figures 2A and 2B are logic block diagrams of an embodiment of the invention.

As described generally above, the application to Rosenberg at al. concerns itself with an automation system for a machine tool. Motion along each co-ordinate axis is separately ordered by command pulses associated with that particular co-ordinate axis. For ordering motion along a co-ordinate axis, it is required that a command pulse order motion in one or the other direction for that particular axis. This situation may be simply handled by having a positive and negative track on tape in which the command pulses are stored. Obviously a pulse in the positive track represents motion in one direction and a pulse in the negative track represents motion in the opposite direction.

Figure 1 shows a simple block diagram which represents a digital servo system of the type in which the embodiment of this invention finds use. It should be appreciated that for each co-ordinate along which it is desired to control the motion for a machine tool a separate source of command pulses 1 is employed. Each command pulse commands a predetermined increment of motion. This may be, for example, on the order of one-thousandth of an inch. The output of the source of command pulses is applied to a control circuit 2. This rectangle 2 represents the embodiment of the invention which is being described and claimed herein. Also being applied to the input of the control circuit are output signals from the motion transducer 3. This output comprises, whenever there is motion, a first and second train of relatively phase-displaced signals. The extent of phase displacement required depends on the type of motion transducer employed, but preferably is 90 degrees.

The function of the control circuit is to receive the signals from both signal sources and to restrain operation responsive to one while the information carried in the other is being applied to the succeeding circuitry, and then to supply the information carried in the second of the signals received. Thus, the output of this control circuit is applied to a reversible counter 4. The output of the reversible counter consists of a number representing the distance which the controlled apparatus 6 has yet to move in order to completely fulfill the command. The output of the reversible counter is converted by suitable digital-to-analog converting circuitry 5 to an analog voltage, or current, which is applied to control the controlled apparatus. The amplitude and polarity of the analog voltage, or current, determines the rate and direction of motion.

On the controlled apparatus, and in conjunction therewith, there are positioned suitable motion transducers, one for each co-ordinate axis, whose functions it is to generate signals from which both the fact that motion has occurred may be deduced, as well as the direction of motion. These signals should also be capable of indicating the extent of the motion which has occurred. One motion transducer has been broadly referred to here as motion-transducer signal source 3. This apparatus is well known and may be either the optical grating type, using diffraction gratings and a photocell pickup, or the inductive type, actuated from the drive shaft by an antibacklash stepup gear train and instrument synchro transformer. These are sold, for example, by Farrand Optical Company, Inc., of New York city, New York, and called "Inductosyn." A magnetically actuated motion transducer may also be used. A magnetic motion transducer may be purchased commercially from the Telecomputing Corporation of North Hollywood, California.

To exemplify the type of output, as well as the general type of operation of the system, but not to be construed as a limitation thereon, let it be assumed that the moving table of a machine tool along each co-ordinate moves a magnetic tape which had previously recorded thereon two trains of signals which are relatively displaced by 90° of one wavelength. Whenever the machine-tool table moves along one co-ordinate, two magnetic reading heads which are positioned over the two tracks on the tape for that co-ordinate will provide as their output two phase-displaced trains of signals. It is these two signal trains which are applied to the control circuit, as well as the motion-command signals from the source of command pulses.

When the first of the command pulses is applied, the output of the control circuit to the reversible counter will be two pulses in an order indicative of the direction of motion commanded. The reversible counter will be able to count one, the digital-to-analog converter will convert this to a representative voltage or current, which then proceeds to drive the machine tool one increment of motion. When this occurs, the motion transducer signal apparatus is energized and will apply to the control circuit the two signals. These will arrive either before, coincident with, or after the next command pulse from the source of command pulses. The time of arrival, of course, is determined by the response time of the system, as well as the frequency of the pulses being provided from the source of command pulses. The storage and priority-determining circuit must then provide an output which conveys the intelligence received from both the command pulse source and the source of motion transducer signals.

It was mentioned previously that the preferred type of error register is a gas tube counter manufactured by the Atomic Instruments Company of Boston, Massachusetts, which requires as its input two pulses. These are applied to two input terminals, and the order of their occurrence determines whether or not the counter advances or subtracts. This is not to be considered a limitation upon the invention, since the order of occurrence of the output pulses on two output terminals of the invention may be employed to operate any other type of counter or apparatus. It is well known in the art to arrange circuitry so that the first pulse which arrives at the output terminals can control the operation of the subsequent apparatus in response thereto. Obviously, the first pulse to arrive conveys the intelligence as to the direction of motion desired in response thereto.

Reference is now made to Figures 2A and 2B which show an embodiment of the invention in block diagram form. By way of illustration and not to be construed as a limitation upon the invention there is shown a magnetic tape 10, upon which there has been previously recorded in two channels two signal trains which are phase-displaced relative to one another. The displacement is preferably a quadrature displacement. Two magnetic transducer heads 12, 13 are positioned over each one of the tracks. They are also positioned to be aligned with one another. It is also to be understood that the magnetic tape is movable with the moving part of a machine tool which is being controlled. The transducer heads are held stationary. Any of the other motion transducer systems previously mentioned may also be employed. These also provide as output two trains of signals which are relatively phase-displaced with respect to each other whenever motion has occurred. The number of signals in the two trains obviously is directly related to the extent of motion.

These two trains of signals, which in the illustration in Figure 2, are the outputs of the two transducers 12, 13 are respectively applied to two Schmitt trigger circuits 14, 16. The Schmitt trigger circuit is a well-known type of trigger circuit and is described in an article by O. H. Schmitt, entitled A Thermionic Trigger, which is in the Journal of Scientific Instruments, volume XV, pp. 24–26, January 1938. This trigger circuit has two stable states, one of which it assumes as long as a pulse is applied to its output. It returns and remains in the other stable state when its input is removed. It is usually employed to square the wave shape of the signal applied thereto. Since the Schmitt trigger circuit contains two cross-coupled triodes, one of which is conducting when the other is not, a first output may be taken from one of the triodes when a signal is applied to the input to the trigger circuit, which output may be designated as the "on" output. When the input signal is removed, the other triode tube becomes conducting and a second output may be obtained at that time which can be designated as the "off" output.

The constants and bias applied to the Schmitt trigger circuit may be chosen so that the signal required to trip it to the state wherein it will produce an "on" output signal must exceed or be equal to a predetermined amplitude. When the input signal does not exceed this predetermined amplitude, the Schmitt trigger circuit returns to its "off" state. Thus, the output lead designated as 15 from the Schmitt trigger 14 will be designated as its "off" output; output lead 17 is designated as its "on" output. For Schmitt trigger 16, output lead 19 is designated as its "off" output and output lead 21 is designated as its "on" output. The "off" output lead 17 of Schmitt trigger 14 is applied to an And gate 20. The "on" output lead 15 is applied to an And gate 18. And gates 18 and 20 and others to be hereafter referred to are known as coincidence gates, requiring a coincidence in the presence of all of the inputs to the gate before an output may be derived. These And gates are well-known circuitry and may be found described, for example, in an article by Tung Chan Chen in the publication of the Institute of Radio Engineers, vol. 38, pp. 511–514, May 1950, and is entitled Diode Coincidence and Mixing Circuits in Digital Computers.

The output of And gate 18 is applied to a gate 22. This gate is merely a one-input buffer gate. The output of gate 22 is applied to a flip-flop circuit 24. A flip-flop circuit is well known in the art. A suitable one is described and shown in the book Electronics, by Elmore and Sands, published by the McGraw-Hill Book Company, on pp. 105–109. It has two stable states and may be driven from one stable state to the other stable state by the application of pulses to its two inputs. One of these stable states is a first stable state and is also known as the reset condition. The other, or second, stable state is also known as the set condition of the flip-flop. Thus, the output of gate 22 will drive flip-flop 24 to its second stable state, or to its set condition.

In being driven in this manner, one of the two tubes of the flip-flop circuit will become conductive and the other will not. Thus, the flip-flop circuit simultaneously can provide both a positive- and negative-going output. The output of the tube which becomes conductive is negative and is the one which provides the "set" output. This is applied to an And gate 20 as its second required input. The positive output of the other tube which is then not conductive is applied to a gate 26. This buffer gate applies this output to drive a flip-flop 28 to its set condition. It should be noted that the output of flip-flop 28, when it is reset, is applied to the And gate 18 as its second required input. Thus, when flip-flop 28 is driven to its set condition, the second required input to And gate 18 is withdrawn.

In response to motion of the machine tool which is being controlled, the Schmitt trigger 14 will be driven by the succeeding signal, assuming it exceeds the predetermined value. Thus, And gate 20 can now provide an output, since one of its inputs is provided from the set output of flip-flop 24, and the other of its inputs is provided by the "on" lead 17 of the Schmitt trigger 14.

At this time it should be noted that the output of And gate 18, besides being applied to gate 22, is also applied to two other And gates 30, 34. At the time of the application of the output from And gate 18, the Schmitt trigger 16 was providing an "on" output, then And gate 34 is enabled, and the output of And gate 34 can reset a flip-flop 32 if it is not already reset. If Schmitt trigger 16 is providing an output at the time, then And gate 30 can apply an output to set the flip-flop 32. It is thus seen that flip-flop 32 is driven to indicate the condition of the Schmitt trigger 16 at the time that Schmitt trigger 14 provides an "off" output.

The output of And gate 20 is applied to two And gates 44, 46. These also have as their second required inputs respectively the "off" and "on" outputs of Schmitt trigger 16. These two And gates also respectively apply their outputs to a flip-flop 48 to drive it to its set or reset condition. Therefore, at the time And gate 20 is enabled by the "on" output of Schmitt trigger 14, flip-flop 48 is driven to store or indicate whatever the output of Schmitt trigger 16 is at the time.

And gate 20 output as previously indicated is also applied to a buffer gate 36 to drive flip-flop 38 to its set condition. The output derived from the reset side of the flip-flop when this occurs is applied to a gate 40, the output from which resets flip-flop 24. An And gate 42 has applied as two of its required inputs an output from flip-flop 24 when it is reset and an output from flip-flop 28 when it is set. Both of these outputs are now provided. The third input to And gate 42 is what may be termed an inhibiting input. That is, when this input is present And gate 42 is blocked, and when it is not present, And gate 42 may provide an output. This inhibiting input is received when the circuits responsive to the command-pulse inputs are in operation, as will be described later herein.

For the purposes of simplification of this discussion, assume for the present that no inhibiting input is applied. The output from And gate 42 can then be applied to a delay circuit 54, as well as to two And gates 50, 52. The output of the delay circuit 54, after a suitable delay interval, resets flip-flop 28 through the gate 57. The delay circuit 54 may be either the well-known passive delay network being made of resistors and condensers, or it may be a univibrator circuit which provides an output in response to an input after a time which is determined by the constants of this circuit. When reset, the output of flip-flop 28 is applied to an And gate 62. The second enabling input to And gate 62 is derived from the set output of flip-flop 38. The output of And gate 62 is applied to two And gates 64, 66, and also to a delay network 68, similar to that previously described. The output of the delay network 68 resets the flip-flop 38 through the buffer gate 70. At this time, the three flip-flops 24, 28, and 38 are reset, ready for the next cycle of operation.

It should now be appreciated that And gate 42 has operated to provide an output pulse first and And gate 62 has operated to provide an output pulse second. Thus, a first and second pulse are provided which are spaced in time as determined by the speed of operation of the three flip-flop circuits, which in turn is determined by the values of the components from which they are constructed. And gate 50 has three required inputs; one of these is the output of And gate 42; the second is the reset output of flip-flop 48; and the third is the set output of flip-flop 32. These two flip-flops, as previously described, store the condition of the Schmitt trigger circuit 16 on two occasions, first, when Schmitt trigger 14 is providing an "off" output and next when Schmitt trigger 14 is providing an "on" output. If motion has occurred, then the Schmitt trigger 16 output will differ on those two occasions. Thus, the flip-flops 32 and 48 will have different stable states. It should be further noted that the direction of motion will result in flip-flop 32 being in a first stable state and flip-flop 48 being in a second stable state, or in flip-flop 32 being in a second stable state and flip-flop 48 being in a first stable state. The direction of motion which has occurred establishes the relative stable states of these two flip-flops.

And gate 52 has one input from And gate 42, a second input from the set output of flip-flop 48, and a third input from the reset output of flip-flop 32. Thus, when an output pulse is received from And gate 42, either And gate 50 or And gate 52 will have all of its required inputs present and will provide an output to the subsequent Or gates. The one of these two And gates which will provide the output is indicative of the direction of motion at the time. And gates 64 and 66 receive the second output from And gate 52 and respectively the same inputs as And gates 52 and 50. Thus, if upon the application of the first output pulse from And gate 42 And gate 50 provided an output, then upon the occurrence of the second pulse from And gate 62, And gate 66 will provide an output. If the direction of motion which has been sensed by the gating means driven from Schmitt trigger 16 is in reverse, then And gate 52 will provide the first output pulse and And gate 64 will provide the second output pulse received from And gate 62.

And gates 50 and 64 have their outputs applied to an Or gate 54. And gates 52 and 66 have their outputs applied to an Or gate 58. An Or gate is merely a buffer gate, well known in the art, which provides an output whenever any one of its multiple inputs is excited. These Or gates will also be found described in the previously noted article by Tung Chan Chen. The output of Or gate 54 is applied to an Or gate 56 and to a second Or gate 92. The output of Or gate 58 is applied to Or gate 60 and also to the Or gate 92. A first pulse output terminal 72 receives the output of Or gate 56, and a second pulse output terminal 74 receives the output of Or gate 60. It will thus be appreciated that when output terminal 72 provides a first output pulse, and output terminal 74 provides a second output pulse, one direction of motion has been sensed. When the first output pulse appears on terminal 74 and a second output pulse appears on terminal 72, the opposite direction of motion has been sensed. The succeeding register is thus controlled to add or subtract a count in accordance with the direction of motion which has been sensed.

To review the operation of the system described, Schmitt trigger 14 provides what may be called the timing for the sensing operation of the condition of Schmitt trigger 16. The sensing operation is performed by the And gates 30, 34, and 44, 46. Flip-flops 32 and 48 store the output condition of Schmitt trigger 16 at the two successive intervals. And gates 18 and 20 may also to a certain degree be considered as sensing the occurrence of motion, since if none occurs these And gates will not be successively enabled. However, the successive enabling of these two And gates permits the operation of the three flip-flops 24, 28, 38, which, in effect, result in the generation of two pulses which are spaced apart in time. The application of these two pulses to the output terminals is controlled by the gating means which, in effect, is responsive to the direction of motion indications stored in the flip-flops 32, 48.

The description that follows is that of the circuitry which is actuated responsive to the command pulses to co-operate with the circuitry previously described. A command pulse will be received on line 76 or 78, depending upon the direction of motion which it is desired to command. Buffer gates 80 and 82 respectively apply the one or the other of the inputs to set or reset flip-flop 84. Thus, the direction which it is desired to command motion is stored in flip-flop 84. An Or gate 86 is enabled as a result of the application of an input pulse to the circuitry to drive a one-shot multivibrator 88. This one-shot provides an output pulse to And gate 90. And gate 90 has three inputs. One of these is an input from one-shot 88, as described. The other two are inputs from Or gate 92 and a delay network 94. These other two inputs are inhibiting inputs, and when they are present And gate 90 does not provide an output.

It will be recalled that Or gate 92 receives inputs whenever the circuitry responsive to the occurrence of motion is energized to apply two pulses to the first and second output terminals. Therefore, in the presence of these two pulses, And gate 90 is blocked. The input to delay network 94 is the same as the output of Or gate 92. The delay network output is employed to extend the time that And gate 90 is blocked. The reason for the use of the delay network is so that the inhibiting action may be prolonged beyond the application of the first and second pulses of the subsequent apparatus so that the subsequent apparatus may clear and be ready for the operation responsive to operation of the command pulse circuitry. It is required that one-shot multivibrator 88 provide an output which is long enough to be present after the inhibiting input to And gate 90 has been removed.

And gate 90 applies its output to the buffer gate 96. The output of the buffer gate is applied to drive a first univibrator or one-shot multivibrator 98. The output of the one-shot multivibrator 98 drives a following univibrator or one-shot multivibrator 100. The outputs of these two univibrators 98 and 100 correspond to the first and second pulses which were generated in the output of And gates 42 and 62.

The subsequent circuitry to be described serves the same function as the gating means circuitry following And gates 42 and 62, which properly channels these two pulses to the output terminals 72, 74 in accordance with the direction of motion which has been indicated.

Univibrator 98 has its output also applied to an Or gate 106 and And gate 102, and a second And gate 104. One-shot 100 has its output applied also to the Or gate 106, to an And gate 108, and to a second And gate 110. Flip-flop 84 has one of its outputs applied to And gates 108 and 102. The other of its outputs is applied to And gates 104 and 110. Accordingly, if one direction of motion has been commanded, And gates 108 and 102 are enabled so that the pulse from one-shot 98 is applied to And gate 104 and a pulse from one-shot 100 is applied to And gate 108. The output of Or gate 114, consisting of the first pulse, is then applied to output terminal 74 and the output of Or gate 112 consisting of the second pulse is applied to output terminal 72. If flip-flop 84 was in its second stable state, then And gates 104 and 110 are enabled, whereby the first output pulse from And gate 104 is applied to Or gate 112 to output terminal 72, and the second output pulse from And gate 110 is applied to Or gate 114 to output terminal 74. Since, in the actual operation of the system, the command pulse precedes the motion of the machine tool, the response pulses which are applied to the arithmetic register should be applied in a manner to subtract from the sum contained therein as a result of the application of command pulses.

The output of Or gate 106 is applied to a delay network 118 and also directly to a second Or gate 116. The output of delay network 118 is also applied to the Or gate 116. Thus, the output of Or gate 106, which is applied to Or gate 116, is a prolonged output. The output of Or gate 116 is applied to an integrating network 120. The output of the integrating network is the inhibiting input to And gate 42. The integrating network 120 is a fast-charging network which has the function of maintaining its output for an interval beyond the interval of the input. By inhibiting And gate 42, the conditions of the motion-responsive networks are in effect frozen during and for a short time after the interval of operation of the one-shot multivibrators 98 and 100. This, effectively, prevents any output being derived from the motion-responsive network while output is being obtained as a result of controlled pulses being received.

As previously described, if the response network is in operation at the time command pulses are received, then the command pulse network is prevented from operating until such time as the completion of operation in response to the sensing of motion. At this time, the command pulse network can prevent further operation of the response network until the command pulse network has completed its operation. In the event that command pulses arrive simultaneously with the arrival of response signals, the priority of operation is given to the command-pulse network, since in view of the circuit components and circuit logic employed it is designed to operate more quickly.

Accordingly, there has been described and shown a novel, useful arrangement for providing a first and second output pulse at output terminals in an order determined by the direction of motion sensed from a first and second train of pulses generated responsive to said motion or to a command pulse ordering a particular direction of motion. Means are provided for preventing faulty operation by priority-determining networks, which hold the operation of the generation of pulses of one until the other has been cleared. These networks then permit the second generation of pulses to occur. Storage means are provided to enable this operation to occur.

We claim:

1. A circuit for generating a first and second pulse in a manner representative of a direction of motion responsive to motion command pulses and to a first and second train of relatively phase-displaced signals generated responsive to motion comprising first gate means to sense motion and direction of motion from said first and second signal trains, first storage means to store an indication of one or the other direction of motion responsive to said first gate means, first means to generate a first pulse followed by a second pulse responsive to the sensing of motion by said first gate means, a first and second output pulse terminal, second gate means to apply said first pulse and second pulse respectively to said first and second output pulse terminals or to said second and first output pulse terminals in response to one or other direction of motion indicated by said first storage means, a second storage means, means to apply a command pulse to said second storage means to store an indication of the direction of motion represented by said command pulse, second means to generate another first and second pulse responsive to the application of a command pulse, means to apply said another first and second pulses respectively to said first and second output pulse terminals or to said second and first output pulse terminals in response to the direction of motion indicated by said second storage means, means to inhibit operation of said first means to generate responsive to previous operation of said second means to generate until after said second means to generate is finished, and means to inhibit operation of said second means to generate responsive to previous operation of said first means to generate until after said first means to generate is finished.

2. A circuit for generating a first and second pulse in a manner representative of a direction of motion responsive to motion command pulses and to a first and second train of relatively phase-displaced signals generated responsive to motion said circuit comprising a first and a second flip-flop circuit each having a first and a second stable state, a first means enabled responsive to a signal in said first train exceeding a predetermined amplitude to drive said first flip-flop to a first stable condition if said second train signal at the time exceeds a predetermined value or to a second stable condition if said second train signal at the time does not exceed said predetermined value, a second means enabled responsive to the signal in said first train falling below said predetermined amplitude to drive said second flip-flop to its first stable condition if said second train signal at the time exceeds said predetermined value and to its second stable condition if said second train signal at the time does not exceed said predetermined value, a third flip-flop circuit having a first and second stable state, means to drive said third flip-flop to its first stable state responsive to a command pulse indicative of motion in one direction and to drive said third flip-flop circuit to its second stable state responsive to a command pulse indicative of motion in an opposite direction, first means to generate a first and second pulse in one order responsive to said first and second flip-flop circuits respectively being in their first and second stable states and to generate a first and second pulse in a reverse order responsive to said first and second flip-flop circuits respectively being in their second and first states, second means to generate a first and second pulse in one order responsive to said third flip-flop being in one stable state and in a reverse order responsive to said third flip-flop being in its second stable state, means responsive to said second means to generate having commenced operation to prevent said first means to generate from operating until after said second means to generate has finished, and means responsive to said first means to generate having commenced operation to prevent said second means to generate from operating until after said first means to generate has finished.

3. A circuit for generating a first and second pulse in a manner representative of a direction of motion responsive to motion command pulses and to a first and second train of relatively phase-displaced signals generated responsive to motion comprising first and second trigger circuits to which said first and second trains of signals are applied each said first and second trigger circuits providing a first output responsive to a signal exceeding a predetermined value and a second output when said signal does not exceed said predetermined value, first and second flip-flop circuits each having a first stable state and a second stable state, first gate means for driving said first flip-flop circuit to its first stable state responsive to a first output from said second trigger circuit and to its second stable state responsive to a second output from said second trigger circuit, means for energizing said first gate means when said first trigger circuit provides a first output, second gate means for driving said second flip-flop circuit to its first stable state responsive to a first output from said second trigger circuit and to a second stable state responsive to a second output from said second trigger circuit, means for energizing said second gate means responsive to a second output from said first trigger circuit, a third flip-flop circuit having a first and second stable state, means to drive said third flip-flop circuit to its first stable state responsive to a command pulse indicative of motion in one direction and to drive said third flip-flop to its second stable state responsive to a command pulse indicative of motion in an opposite direction, first means to generate a first and second pulse in one order responsive to said first and second flip-flop circuits respectively being in their first and second stable states and to generate a first and second pulse in a reverse order responsive to said first and second flip-flop circuits respectively being in their second and first states, second means to generate a first and second pulse in one order responsive to said third flip-flop being in one stable state and in a reverse order responsive to said third flip-flop being in its second stable state, means to prevent operation of said first means to generate responsive to a pulse output from said second means to generate until said second means to generate has ceased operation, and means responsive to a pulse output from said first means to generate to prevent said second means to generate from operation until said first means to generate has terminated its operation.

4. A circuit as recited in claim 3 wherein said first means to generate a first and second pulse includes a fourth, fifth, and sixth flip-flop circuit each having a first and second stable state, means to drive said fourth and fifth flip-flop circuits to their second stable states responsive to a second output from said first trigger circuit, means to drive said sixth flip-flop to its second stable state responsive to a first output from said first trigger circuit, means responsive to said sixth flip-flop being driven to its second stable state to drive said fourth flip-flop to its first stable state, whereby a first output pulse is generated, means to apply said first output pulse to drive said fifth flip-flop to its first stable state whereby a second output pulse is generated, means to apply said second output pulse to drive said sixth flip-flop to its first stable state, a first and a second pulse output terminal, and output gate means responsive to the stable states of said first and second flip-flops to apply said first and second output pulses to said first and second pulse output terminals.

5. A circuit as recited in claim 4 wherein said means to prevent operation of said first means to generate responsive to a pulse from said second means to generate includes a coincidence gate having a first input from said fourth flip-flop in its first stable state, a second input from said fifth flip-flop in its second stable state, and a third inhibiting input from said second means to generate the output of said coincidence gate being coupled to drive said fifth flip-flop and to said output gate means.

6. A circuit as recited in claim 4 wherein said second means to generate a first and second pulse includes a first pulse generator, means to drive said first pulse generator responsive to a command pulse being applied to said third flip-flop circuit, a second pulse generator driven responsive to said first pulse generator, four coincidence gates, a first and third of which have their outputs coupled to said first pulse output terminal, a second and fourth of which have their outputs coupled to said second pulse output terminal, means to apply said first pulse generator output to said second and third coincidence gate inputs, means to apply said second pulse generator output to said first and fourth coincidence gate inputs, means to apply output from said third flip-flop when in one stable state to said first and fourth coincidence gate inputs, and means to apply output from said third flip-flop when in its second stable state to said second and third coincidence gate inputs.

7. A circuit as recited in claim 6 wherein said means to prevent operation of said second means to generate includes a coupling gate coupled between the input to said third flip-flop circuit and said first pulse generator, and means to apply output from said output gate means to said coupling gate to inhibit operation of said coupling gate.

8. A circuit for generating a first and a second pulse in an order representative of a direction of motion responsive to a first and a second train of relatively phase-displaced signals generated responsive to motion comprising first and second means to which said first and second trains of signals are applied, each said first and second means generating a first output responsive to a signal exceeding a predetermined value and a second output when said predetermined value signal is not exceeded, a first and a second storage means, means to store in said first storage means an indication of the output of said second means when said first means provides a second output, means to store in said second storage means an indication of the output of said second means at the time when said first means next provides a first output, and means enabled by said first means providing said second output to generate a first and second pulse in one order responsive to said first and second storage means having respectively stored that said second means provided a first output and then a second output and to generate a first and second pulse in reverse order responsive to said first and second storage means having respectively stored that said second means provided a second output and then a first output.

9. A circuit for generating a first and second pulse in an order representative of a direction of motion responsive to a first and a second train of relatively phase-displaced signals generated responsive to motion comprising first and second trigger circuits to which said first and second trains of signals are applied each said first and second trigger circuits providing a first output responsive to a signal exceeding a predetermined value and a second output when said signal does not exceed said predetermined value, first and second flip-flop circuits each having a first stable state and a second stable state, first gate means enabled by a first trigger circuit first output for driving said first flip-flop circuit to its first stable state responsive to first outputs from said second trigger circuits and to its second stable state responsive to a second output from said second trigger circuit, second gate means enabled by a first trigger circuit second output for driving said second flip-flop circuit to its first stable state responsive to a first output from said second trigger circuit and to a second stable state responsive to a second output from said second trigger circuit, and means to generate a first and second pulse in one order responsive to said first and second flip-flop circuits respectively being in their first and second stable states and to generate a first and second pulse in a reverse order responsive to said first and second flip-flop circuits respectively being in their second and first states.

10. A circuit for generating a first and second pulse in an order representative of a direction of motion responsive to a first and a second train of relatively phase-displaced signals generated responsive to motion comprising first and second means to which said first and second trains of signals are respectively applied, each said first and second means providing a first output responsive to the presence of a signal having a predetermined value and a second output responsive to the absence of a said predetermined value signal, first and second flip-flop circuits each having a first and second stable condition, means enabled by said first means producing one of its two outputs to drive said first flip-flop circuit to one of its two stable conditions responsive to said second means producing a first output at the time and to the other of its two stable conditions responsive to said second means producing a second output at the time, means enabled by said first means producing the other of its two outputs to drive said second flip-flop circuit to one of its two stable conditions responsive to said second means producing a first output at the time and to the other of its two stable conditions responsive to said second means producing a second output at the time, means enabled by said first means producing the other of its two outputs to generate a first pulse followed by a second pulse responsive to said first flip-flop being in its first stable condition and said second flip-flop being in its second stable condition and to generate a second pulse followed by a first pulse responsive to said first flip-flop being in its second stable condition and said second flip-flop being in its first stable condition.

11. A circuit for generating a first and a second pulse in an order representative of a direction of motion in response to a first and second train of relatively phase-displaced signals generated responsive to motion comprising a first and a second trigger circuit to which said first and second trains of signals are respectively applied, each said trigger circuit providing a first output responsive to a signal of a predetermined value and a second output when a signal does not have said predetermined value, a first and a second flip-flop circuit each having two stable states, first and second gate means, means to enable said first gate means responsive to a first output from said first trigger circuit, means to drive said first flip-flop circuit through said first gate means to one stable state responsive to a first output from said second trigger circuit and to a second stable state responsive to a second output from said second trigger circuit, means to enable said second gate means responsive to a second output from said first trigger circuit following the first output which enabled said first gate, means to drive said second flip-flop circuit through said second gate means to one stable state responsive to a first output from said second trigger circuit and to the other stable state responsive to a second output from said second trigger circuit, and means actuated by said second output from said first trigger circuit to provide a first and second pulse in one order responsive to said flip-flop circuits respectively being in their one and other stable states and to provide a first and second pulse in reverse order responsive to said flip-flop circuits respectively being in their other and one stable states.

12. A circuit as recited in claim 11 wherein said means actuated by said second output from said first trigger circuit includes four coincidence gates, means to apply output from said first flip-flop when in its first stable state to said first and second coincidence gates, means to apply output from said first flip-flop when in its second stable state to said third and fourth coincidence gates, means to apply output from said second flip-flop when in its first stable state to said third and fourth coincidence gates, means to apply output from said second flip-flop when in its second stable state to said first and second coincidence gates, and means for applying a first enabling signal to said first and second coincidence gates and a second enabling signal thereafter to said third and fourth coincidence gates responsive to said second output from said first trigger circuit.

13. A circuit as recited in claim 12 wherein said means for applying enabling signals first to said first and second coincidence gates and next to said third and fourth coincidence gates includes third, fourth, and fifth flip-flop circuits each having first and second stable states and respectively providing a first and second output indicative thereof, means to drive said third flip-flop to its second stable state responsive to a second output from said first trigger circuit and an output from said fourth flip-flop circuit in its first stable state, means to drive said fourth flip-flop to its second stable state responsive to said third flip-flop being driven to its second stable state, means for driving said fifth flip-flop to its second stable state responsive to third flip-flop second output and first trigger circuit first output, means to drive said third flip-flop to its first stable state responsive to said fifth flip-flop being driven to its second stable state, means to generate said first enabling pulse responsive to said third flip-flop output and said fourth flip-flop second output, means to drive said fourth flip-flop to its first stable state responsive to said first enabling pulse, means to generate said second enabling pulse responsive to said fourth flip-flop first output and said fifth flip-flop second output, and means to drive said fifth flip-flop to its first stable condition responsive to said second enabling pulse.

No references cited.